United States Patent
Weickert et al.

(10) Patent No.: US 11,559,776 B2
(45) Date of Patent: *Jan. 24, 2023

(54) METHOD FOR IMPROVING THE COOLING CAPACITY OF A GAS SOLIDS OLEFIN POLYMERIZATION REACTOR

(71) Applicant: Borealis AG, Vienna (AT)

(72) Inventors: Günter Weickert, Ahaus (DE); Eric-Jan Prinsen, Aadorp (NL); Klaus Nyfors, Porvoo (FI); Erno Elovainio, Porvoo (FI); Vasileios Kanellopoulos, Linz (AT)

(73) Assignee: BOREALIS AG, Vienna (AT)

( * ) Notice: Subject to any disclaimer, the term of this patent is extended or adjusted under 35 U.S.C. 154(b) by 136 days.

This patent is subject to a terminal disclaimer.

(21) Appl. No.: 16/765,090

(22) PCT Filed: Oct. 25, 2018

(86) PCT No.: PCT/EP2018/079242
§ 371 (c)(1),
(2) Date: May 18, 2020

(87) PCT Pub. No.: WO2019/096557
PCT Pub. Date: May 23, 2019

(65) Prior Publication Data
US 2021/0370255 A1    Dec. 2, 2021

(30) Foreign Application Priority Data
Nov. 17, 2017   (EP) .................................... 17202389

(51) Int. Cl.
*B01J 8/38*    (2006.01)
*B01J 8/18*    (2006.01)
(Continued)

(52) U.S. Cl.
CPC ............. *B01J 8/388* (2013.01); *B01J 8/1827* (2013.01); *B01J 8/1836* (2013.01); *B01J 8/1863* (2013.01);
(Continued)

(58) Field of Classification Search
USPC .................................................. 526/68, 901
See application file for complete search history.

(56) References Cited

U.S. PATENT DOCUMENTS 3,324,093 A    6/1967 Alleman
3,405,109 A    10/1968 Rohlfing
(Continued)

FOREIGN PATENT DOCUMENTS

EP    0045976 A2    2/1982
EP    0045977 A2    2/1982
(Continued)

OTHER PUBLICATIONS

International Search Report and Written Opinion of the International Searching Authority for corresponding International Patent Application No. PCT/EP2018/079242, dated Jan. 18, 2019, 7 pages.

*Primary Examiner* — Fred M Teskin
(74) *Attorney, Agent, or Firm* — Ditthavong, Steiner & Mlotkowski

(57) ABSTRACT

The present invention relates to a method for improving the cooling capacity of a gas solids olefin polymerization reactor by splitting the fluidization gas and returning part of the fluidization gas to the reactor into the bottom zone of the reactor and another part of the fluidization gas directly into the dense phase formed by particles of a polymer of the at least one olefin suspended in an upwards flowing stream of the fluidization gas in the middle zone of the reactor.

13 Claims, 3 Drawing Sheets

(51) Int. Cl.
 *B01J 8/44* (2006.01)
 *C08F 10/00* (2006.01)
 *C08F 2/34* (2006.01)

(52) U.S. Cl.
 CPC ............ *B01J 8/44* (2013.01); *C08F 10/00* (2013.01); *B01J 2208/00176* (2013.01); *B01J 2208/00539* (2013.01); *B01J 2208/00548* (2013.01)

(56) References Cited

U.S. PATENT DOCUMENTS

| | | | |
|---|---|---|---|
| 4,107,414 A | 8/1978 | Giannini et al. | |
| 4,186,107 A | 1/1980 | Wagner | |
| 4,226,963 A | 10/1980 | Giannini et al. | |
| 4,347,160 A | 8/1982 | Epstein et al. | |
| 4,382,019 A | 5/1983 | Greco et al. | |
| 4,435,550 A | 3/1984 | Ueno et al. | |
| 4,465,782 A | 8/1984 | McKenzie et al. | |
| 4,472,524 A | 9/1984 | Albizzati et al. | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack et al. | |
| 4,543,399 A * | 9/1985 | Jenkins, III | B01J 8/1836 526/903 |
| 4,560,671 A | 12/1985 | Gross et al. | |
| 4,581,342 A | 4/1986 | Johnson et al. | |
| 4,582,816 A | 4/1986 | Miro | |
| 4,657,882 A | 4/1987 | Karayannis et al. | |
| 5,391,654 A | 2/1995 | Ahvenainen et al. | |
| 5,428,118 A | 6/1995 | Painter et al. | |
| 6,306,981 B1 * | 10/2001 | Brown | B01J 8/1827 422/132 |
| 8,128,878 B2 * | 3/2012 | Kang | B01J 8/44 422/139 |
| 2001/0024625 A1 * | 9/2001 | Olson | C08F 10/00 422/139 |
| 2005/0113545 A1 * | 5/2005 | Dooley | B01J 8/388 526/68 |
| 2020/0346180 A1 * | 11/2020 | Weickert | B01J 8/24 |

FOREIGN PATENT DOCUMENTS

| | | |
|---|---|---|
| EP | 479186 A2 | 4/1992 |
| EP | 0810235 A2 | 12/1997 |
| EP | 887380 A1 | 12/1998 |
| EP | 1415999 A1 | 5/2004 |
| EP | 1538167 A1 | 6/2005 |
| EP | 1739103 A1 | 1/2007 |
| EP | 1752462 A | 2/2007 |
| EP | 1860125 A1 | 11/2007 |
| EP | 2348056 A1 | 7/2011 |
| EP | 3103818 A1 | 12/2016 |
| GB | 1580635 A | 12/1980 |
| WO | 9212182 A1 | 7/1992 |
| WO | 9512622 A1 | 5/1995 |
| WO | 9532994 A1 | 12/1995 |
| WO | 9618662 A1 | 6/1996 |
| WO | 9632423 A | 10/1996 |
| WO | 9728170 A | 8/1997 |
| WO | 9832776 A1 | 7/1998 |
| WO | 9858976 A | 12/1998 |
| WO | 9858977 A | 12/1998 |
| WO | 9961489 A1 | 12/1999 |
| WO | 0155230 A | 8/2001 |
| WO | 03010208 A | 2/2003 |
| WO | 03051514 A | 6/2003 |
| WO | 03051934 A2 | 6/2003 |
| WO | 2003106510 A1 | 12/2003 |
| WO | 2004085499 A2 | 10/2004 |
| WO | 2005118655 A | 12/2005 |
| WO | 2017025330 A1 | 2/2017 |

* cited by examiner

METHOD FOR IMPROVING THE COOLING CAPACITY OF A GAS SOLIDS OLEFIN POLYMERIZATION REACTOR

CROSS-REFERENCES TO RELATED APPLICATIONS

This application claims priority from PCT Application Serial No. PCT/EP2018/079242, entitled "Method for improving the cooling capacity of a gas solids olefin polymerization reactor," filed on Oct. 25, 2018, which claims priority from the EP Patent Application Serial No: 17202389.7, filed on Nov. 17, 2017; the contents of which are hereby incorporated herein in their entirety by this reference.

The present invention is directed to a method for improving the cooling capacity of a gas solids olefin polymerization reactor.

BACKGROUND

Gas solids olefin polymerization reactors are commonly used for the polymerization of alpha-olefins such as ethylene and propylene as they allow relative high flexibility in polymer design and the use of various catalyst systems. A common gas solids olefin polymerization reactor variant is the fluidized bed reactor.

One of the biggest challenges of exothermic polymerization reactions in gas solids olefin polymerization reactors is the cooling of the reactor. The fluidization gas moving upwards through the dense phase in which the polymerization reaction takes place and the polyolefin particles are polymerized forms gas bubbles which entrain polyolefin powder into the disengaging zone near to the fluidization gas exit. In order to prevent excessive polyolefin powder entrainment into the fluidization gas stream withdrawn from the top zone of the reactor the superficial gas velocity of the fluidization gas stream has to be limited which, however, results in inefficient mixing of the fluidized gas with the polyolefin powder in the dense phase and reduced heat exchange.

U.S. Pat. No. 5,428,118 discloses a process for polymerizing olefins in a gas phase reactor in which hot fluidization gas withdrawn from the reactor is reintroduced into the disengaging zone via a tangential flow of gas or gas-solids.

WO 2017/025330 A1 discloses a process for polymerizing olefins in a gas phase reactor in which a cooled stream of partially condensed fluidization gas withdrawn from the reactor is reintroduced into the disengaging zone.

Both prior art application are not concerned with an improved mixing of the fluidized gas with the polyolefin powder in the dense phase resulting in improved heat exchange and cooling capacity.

Thus, there is still a need in the art to provide a method for improving the cooling capacity of a gas solids olefin polymerization reactor.

SUMMARY OF THE INVENTION

The present invention provides a method for improving the cooling capacity of a gas solids olefin polymerization reactor comprising a top zone, a middle zone, which comprises a top end in direct contact with said top zone and so which is located below said top zone, the middle zone having a generally cylindrical shape, and a bottom zone, which is in direct contact with a bottom end of the middle zone and which is located below the middle zone, comprising the following steps:

a) introducing a first stream of fluidization gas into the bottom zone;
b) polymerizing olefin monomer(s) in the presence of a polymerization catalyst in a dense phase formed by particles of a polymer of the olefin monomer(s) suspended in an upwards flowing stream of the fluidization gas in the middle zone;
c) withdrawing a second stream comprising the fluidization gas from the top zone;
d) introducing the second stream into cooler;
e) withdrawing the cooled second stream from the cooler; and
f) splitting the cooled second stream into a cooled third stream and the first stream;

introducing the cooled third stream through one or more feeding ports in a feeding area of the middle zone at the dense phase in the middle zone of the gas solids olefin polymerization reactor.

Further, the present invention is directed to the use of the method according to any of the preceding claims for improving the mixing of the fluidization gas and the particles of a polymer of the olefin monomer(s) in the dense phase in the middle zone of the gas solids olefin polymerization reactor.

DETAILED DESCRIPTION

Definitions

The present text refers to diameter and equivalent diameter. In case of non-spherical objects the equivalent diameter denotes the diameter of a sphere or a circle which has the same volume or area (in case of a circle) as the so non-spherical object. It should be understood that even though the present text sometimes refers to diameter, the object in question needs not be spherical unless otherwise specifically mentioned. In case of non-spherical objects (particles or cross-sections) the equivalent diameter is then meant.

As it is well understood in the art the superficial gas velocity denotes the velocity of the gas in an empty construction. Thus, the superficial gas velocity within the middle zone is the volumetric flow rate of the gas (in m³/s) divided by the cross-sectional area of the middle zone (in m²) and the area occupied by the particles is thus neglected.

By fluidization gas is meant the gas comprising monomer, and eventual comonomers, chain transfer agent and inert components which form the upwards flowing gas in the gas solids olefin polymerization reactor and in which the polymer particles are suspended, e.g. in the fluidized bed of a fluidized bed reactor. The unreacted gas is collected at the top of the reactor, compressed, cooled and returned to the reactor. As it is understood by the person skilled in the art the composition of the fluidization gas is not constant during the cycle. Reactive components are consumed in the reactor and they are added into the circulation line for compensating losses.

A gas solids olefin polymerization reactor is a polymerization reactor for heterophasic polymerization of gaseous olefin monomer(s) into polyolefin powder particles, which comprises three zones: in the bottom zone the fluidization gas is introduced into the reactor; in the middle zone which usually has a generally cylindrical shape the olefin monomer(s) present in the fluidization gas are polymerized to form the polymer particles; in the top zone the fluidization gas is withdrawn from the reactor. In certain types of gas solids olefin polymerization reactors a fluidization grid (also named distribution plate) separates the bottom zone from the middle zone. In certain types of gas solids olefin polymerization reactors the top zone forms a disengaging or entrainment zone in which due to its expanding diameter compared to the middle zone the fluidization gas expands and the gas so disengages from the polyolefin powder.

The dense phase denotes the area within the middle zone of the gas solids olefin polymerization reactor with an increased bulk density due to the formation of the polymer particles. In certain types of gas solids olefin polymerization reactors, namely fluidized bed reactors, the dense phase is formed by the fluidized bed.

"Entrained polyolefin powder" or "carry-over of particles" denotes polyolefin particles which are withdrawn together with the fluidization gas in the second stream of fluidization gas from the top zone of the gas solids olefin polymerization reactor.

"Circulation gas line" denotes the system of lines or tubes through which the second stream of fluidization gas is reintroduced into the gas solids olefin polymerization reactor as first stream of fluidization gas and as cooled third stream.

"Bulk density" (or "bed density" for fluidized bed polymerization reactors) denotes mass of polymer powder divided by the volume of the reactor, excluding the optional disengaging zone.

In the present invention the different streams are measured as volume streams so that also the split of these streams is meant as volume split measured in v/v.

Differences in temperature ΔT are measured in ° C. if not noted otherwise.

Differences in pressure ΔP are measured in bar if not noted otherwise.

Polymerization

The olefin monomer(s) polymerized according to the method of the present invention are typically alpha-olefins having from 2 to 12 carbon atoms, preferably from 2 to 10 carbon atoms. Preferably, the olefin monomer(s) are ethylene or propylene, optionally together with one or more other alpha-olefin monomer(s) having from 2 to 8 carbon atoms. Especially preferably the method of the present invention is used for polymerizing ethylene, optionally with one or more comonomers selected from alpha-olefin monomer(s) having from 4 to 8 carbon atoms; or propylene, optionally together with one or more comonomers selected from ethylene and alpha-olefin monomer(s) having from 4 to 8 carbon atoms.

Thus, the polymer material is preferably selected from alpha-olefin homo- or copolymers having alpha-olefin monomer units of from 2 to 12 carbon atoms, preferably from 2 to 10 carbon atoms. Preferred are ethylene or propylene homo- or copolymers. The comonomer units of ethylene copolymers are preferably selected from one or more comonomers selected from alpha-olefin monomer(s) having from 4 to 8 carbon atoms. The comonomer units of propylene copolymers are preferably selected from one or more comonomers selected from ethylene and alpha-olefin monomer(s) having from 4 to 8 carbon atoms.

In one preferred embodiment of the invention, in the method according to the invention a polypropylene homo- or copolymer is polymerized from the olefin monomer(s) and optional comonomer(s). Preferably, in this embodiment, the polymerization is carried out at a temperature of 50-100° C. under a pressure of 15-25 barg. Preferably, the molar ratios of the reactants are adjusted as follows: a $C_2/C_3$ ratio of 0-0.05 mol/mol for random polypropylenes, and a molar $C_2/C_3$ ratio of 0.2-0.7 mo/mol for block polypropylenes. Generally, the $H_2/C_3$ molar ratio in this embodiment is adjusted to 0-0.05 mol/mol. Moreover, in this embodiment, the propylene feed is preferably adjusted to 20-40 t/h, whereby the comonomer feed is 0-15 t/h and hydrogen feed is 1-10 kg/h.

In a second preferred embodiment of the invention, in the method according to the invention a polyethylene homo- or copolymer is polymerized from the olefin monomer(s) and optional comonomer(s). Preferably, in this embodiment, the polymerization is carried out at a temperature of 50-100° C. under a pressure of 15-25 barg. Preferably, the molar ratios of the reactants are adjusted as follows: a $C_4/C_2$ ratio of 0.1-0.8 mol/mol for polyethylene-1-butene copolymers and a $C_6/C_2$ ratio of 0-0.1 mol/mol for polyethylene-1-hexene copolymers. Generally, the $H_2/C_2$ molar ratio in this embodiment is adjusted to 0-0.05 mol/mol. Moreover, in this embodiment, the ethylene feed is preferably adjusted to 15-20 t/h, whereby the comonomer feed is adjusted to 0-20 t/h for 1-butene and to 0-7 t/h for 1-hexene. Preferably, hydrogen feed is 1-100 kg/h and diluent feed (propane): 30-50 t/h.

Polymerization Catalyst

The polymerization in the gas-solids olefin polymerization reactor is conducted in the presence of an olefin polymerization catalyst. The catalyst may be any catalyst which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 6 to 100 μm. However, it has turned out that special advantages can be obtained if the support has median particle size from 6 to 90 μm, preferably from 10 to 70 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contains a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerization Stages

The polymerization in the gas-solids olefin polymerization reactor may be preceded by prior polymerization stages, such as prepolymerization or another polymerization stage conducted in slurry or gas phase. Such polymerization stages, if present, can be conducted according to the procedures well known in the art. Suitable processes including polymerization and other process stages which could precede the polymerization process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerization stages.

Gas-Solids Olefin Polymerization

In the gas-solids olefin polymerization reactor polymerization is conducted using gaseous olefin monomer(s) in which the polymer particles are growing.

The present method is suitable for any kind of gas-solids olefin polymerization reactors suitable for the polymerization of alpha-olefin homo- or copolymers. Suitable reactors are e.g. continuous-stirred tank reactors or fluidized bed reactors. Both types of gas-solids olefin polymerization reactors are well known in the art.

Preferably the gas-solids olefin polymerization reactor is a fluidized bed so reactor.

In a fluidized bed reactor the polymerization takes place in a fluidized bed formed by the growing polymer particles in an upwards moving gas stream. In the fluidized bed the polymer particles, containing the active catalyst, come into contact with the reaction gases, such as monomer, comonomer(s) and hydrogen which cause polymer to be produced onto the particles.

Thereby, in one preferred embodiment the fluidized bed reactor can comprise a fluidization grid which is situated below the fluidized bed thereby separating the bottom zone and the middle zone of the reactor. The upper limit of the fluidized bed is usually defined by a disengaging zone in which due to its expanding diameter compared to the middle zone the fluidization gas expands and the gas disengages from the polyolefin powder. Fluidized bed reactors with disengaging zone and fluidization grid are well known in the art. Such a fluidized bed reactor suitable for the method of the present invention is shown in FIG. 1.

In another preferred embodiment the fluidized bed reactor does not comprise a fluidization grid. The polymerization takes place in a reactor including a bottom zone, a middle zone and a top zone. The bottom zone, which has a generally conical shape, forms the lower part of the reactor in which the base of the fluidized bed is formed. The base of the bed forms in the bottom zone with no fluidization grid, or gas distribution plate, being present. Above the bottom zone and in direct contact with it is the middle zone, which has a generally cylindrical shape. The middle zone and the upper part of the bottom zone contain the fluidized bed. Because there is no fluidization grid there is a free exchange of gas and particles between the different regions within the bottom zone and between the bottom zone and the middle zone. Finally, above the middle zone and in direct contact therewith is the top zone which has a generally conical shape tapering upwards.

The bottom zone of the reactor has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidized bed starts to form. When the gas velocity becomes still smaller the bed becomes denser and the polymer particles distribute the gas over the whole cross-section of the bed. Such a fluidized bed reactor without fluidization grid is described in EP-A-2 495 037 and EP-A-2 495 038.

In a gas solids olefin polymerization reactor the upwards moving gas stream is established by withdrawing a fluidization gas stream as second gas stream from the top zone of the reactor, typically at the highest location. The second gas stream withdrawn from the reactor is then cooled and re-introduced to the bottom zone of the reactor as first stream of fluidization gas. In a preferred embodiment, the fluidization gas of the second gas stream is also compressed in a compressor. More preferably, the compressor is located upstream of the cooler. Preferably, the gas is filtered before being passed to the compressor. Additional olefin monomer(s), eventual comonomer(s), hydrogen and inert gas are suitably introduced into the circulation gas line. It is preferred to analyze the composition of the circulation gas, for instance, by using on-line gas chromatography and adjust the addition of the gas components so that their contents are maintained at desired levels.

The polymerization is generally conducted at a temperature and pressure where the fluidization gas essentially remains in vapour or gas phase. For olefin polymerization the temperature is suitably within the range of 30 to 110° C., preferably 50 to 100° C. The pressure is suitably in the range of 1 to 50 bar, preferably 5 to 35 bar.

In order to remove entrained polyolefin powder the circulation gas line, i.e. the line for withdrawing the second stream, preferably comprises at least one cyclone. The cyclone has the objective of removing the entrained polymer material from the circulation gas. The polymer stream recovered from the cyclone can be directed to another polymerization stage, or it may be returned into the gas solids olefin polymerization reactor or it may be withdrawn as the polymer product.

In the case the polymer stream recovered from the cyclone is returned into the gas-solids polymerization reactor the polymer stream is returned through one or more feedings ports, which are different feeding ports as the one or more feeding ports for introducing the cooled third stream into the dense phase in the middle zone of the gas-solids olefin polymerization reactor.

Preferably, the cooled third stream comprises not more than 5 wt % solid polymer with respect to the total weight of the cooled third stream, more preferably not more than 3 wt % solid polymer, even more preferably not more than 2 wt % solid polymer and most preferably not more than 1 wt % solid polymer.

Circulation of the Fluidized Gas

According to the present invention the fluidization gas is withdrawn from the top zone of the reactor as second stream, optionally compressed by a compressor, introduced into a cooler, withdrawn from the cooler as cooled second stream and split into a cooled third stream and the first stream. The first stream is introduced into the reactor into the bottom zone whereas the cooled third stream is introduced into the reactor through one or more feeding ports in a feeding area of the middle zone at the dense phase in the middle zone of the reactor. Thereby, the third stream is not mixed with particles of the polymer of the olefin monomer(s) before entering the reactor and thus is not introduced into the reactor through feeding ports for reintroducing particles of the polymer of the olefin monomer(s) into the gas solids olefin polymerization reactor.

The feeding area of the middle zone is preferably located on the surface of the middle zone between the top end and 50% of the total height of the middle zone, whereas the bottom end corresponds to 0% and the top end corresponds to 100% of the total height of the middle zone. More preferably, the feeding area of the middle zone is located on the surface of the middle zone between the top end and 70% of the total height of the middle zone.

Preferably, the cooled third stream is introduced through the one or more feeding ports into the dense phase in the middle zone of the gas solids olefin polymerization reactor in an introduction angle of 5° to 75°, preferably 10° to 65°, most preferably 15° to 60°. The introduction angle is the angle between a projection and a perpendicular line, whereas the projection is the projection of the direction of the cooled third stream after introduction into the reactor on a projection plane, which crosses the tangent plane of the generally cylindrical shape of the middle zone at the location of the one or more feeding ports and along an intersection line between the tangent plane and the generally cylindrical surface of the middle zone, whereas the projection plane is located perpendicular to the tangent plane and whereas the perpendicular line crosses the generally cylindrical surface of the middle zone at the location of the one or more feeding ports, is parallel to the projection plane and is perpendicular to the tangent plane (cf. FIG. 2). Most preferably, the optimal introduction angle for introducing the cooled third stream has been found to be about 20°.

The number of feeding ports for introducing the cooled third stream is in the range of preferably 1 to 15, more preferably 2 to 10 and most preferably 2 to 5.

The feeding ports are preferably distributed across the middle zone of the gas solids olefin polymerization reactor in axial and/or radial direction with the proviso that the cooled third stream is introduced into the dense phase.

Preferably, the fluidization gas of the cooled third stream is compressed by a compressor. The compressor could either be located upstream or downstream of the cooler. Even more preferably, before being introduced into the cooler, the second stream is introduced into a compressor; withdrawn from the compressor as the compressed second stream and introduced as compressed second stream into the cooler.

In the cooler the second stream is preferably cooled as such that the cooled second stream, and as a consequence also the cooled third stream and/or the first stream, comprise condensed fluidization gas, preferably together with gaseous fluidization gas. Preferably, the cooled second stream and as a consequence also the cooled third stream and/or the first stream, comprise from 1 to 30 wt % condensed fluidization gas, more preferably from 3 to 25 wt % condensed fluidization gas and most preferably from 5 to 20 wt % condensed fluidization gas, based on the total weight of the cooled second stream and as a consequence also the cooled third stream and/or the first stream. The remaining weight of the cooled second stream and as a consequence also the cooled third stream and/or the first stream preferably consists of gaseous fluidization gas.

In another embodiment the cooled second stream is not condensed or partly condensed and does not comprise condensed fluidization gas. As a consequence also the cooled third stream and the first stream in said embodiment do not comprise condensed fluidization gas.

The cooled second stream is split into the cooled third stream and the first stream at a ratio of 5:95 (v/v) to 75:25 (v/v), preferably 7:93 (v/v) to 65:35 (v/v), most preferably 10:90 (v/v) to 50:50 (v/v).

Depending on the volume split between the cooled third stream and the first stream the cooled third stream has a certain pressure and contributes to the superficial gas velocity of the upwards flowing stream in the middle zone of the reactor.

The pressure difference between the cooled third stream and the polymerization pressure in the gas solids polymerization reactor, $\Delta P$, is at least 0.1 bar, preferably at least 0.3 bar, most preferably at least 0.5 bar. The upper limit for the pressure difference is usually not higher than 10 bar, preferably not higher than 7 bar.

It is further preferred that the superficial gas velocity of the upwards flowing stream of the fluidization gas in the middle zone of the reactor is from 0.3 to 1.2 m/s, more preferably from 0.35 to 1.0 m/s, most preferably from 0.45 to 0.9 m/s.

Thereby, the superficial gas velocity of the first stream of fluidization gas introduced into the bottom zone is preferably lower than the superficial gas velocity of the upwards flowing stream of the fluidization gas in the middle zone and is preferably in the range of from 0.1 to 1.3 m/s, more preferably of from 0.15 to 1.1 m/s, most preferably of from 0.2 to 1.0 m/s.

The bulk density of the dense phase during polymerization is in the range of from 100 to 500 kg/m$^3$, preferably of from 120 to 470 kg/m$^3$, most preferably of from 150 to 450 kg/m$^3$.

It has been found that the introduction of the cooled third stream into the dense phase in the middle zone of the gas solids olefin polymerization reactor improves the mixing of the fluidization gas and the particles of a polymer of the at least one olefin in the dense phase in the middle zone of the gas solids olefin polymerization reactor. As a consequence the heat exchange and the cooling capacity is improved.

Preferably, the difference of the maximum temperature and the minimum temperature, $\Delta T$, of the dense phase during polymerization is not higher than 10° C., more preferably not higher than 7° C., still more preferably not higher than 5° C. and most preferably not higher than 3° C.

Benefits of the Invention

It has been found that the introduction of the cooled third stream into the dense phase in the middle zone of the gas solids olefin polymerization reactor improves the mixing of the fluidization gas and the particles of a polymer of the at least one olefin in the dense phase in the middle zone of the gas solids olefin polymerization reactor to more even mixing conditions.

As a consequence the heat removal from the dense phase is more enhanced.

The temperature profile throughout the dense phase is more even with a minimum difference of the maximum temperature and the minimum temperature, $\Delta T$, of the dense phase during polymerization.

The more even temperature profile leads to more homogeneous polymerization conditions throughout the dense phase resulting in more homogeneous polyolefin products. As a consequence, the risk to produce off spec polymer material is substantially reduced.

FIGURES

REFERENCE SIGNS FOR FIG. 1

Figure 1:
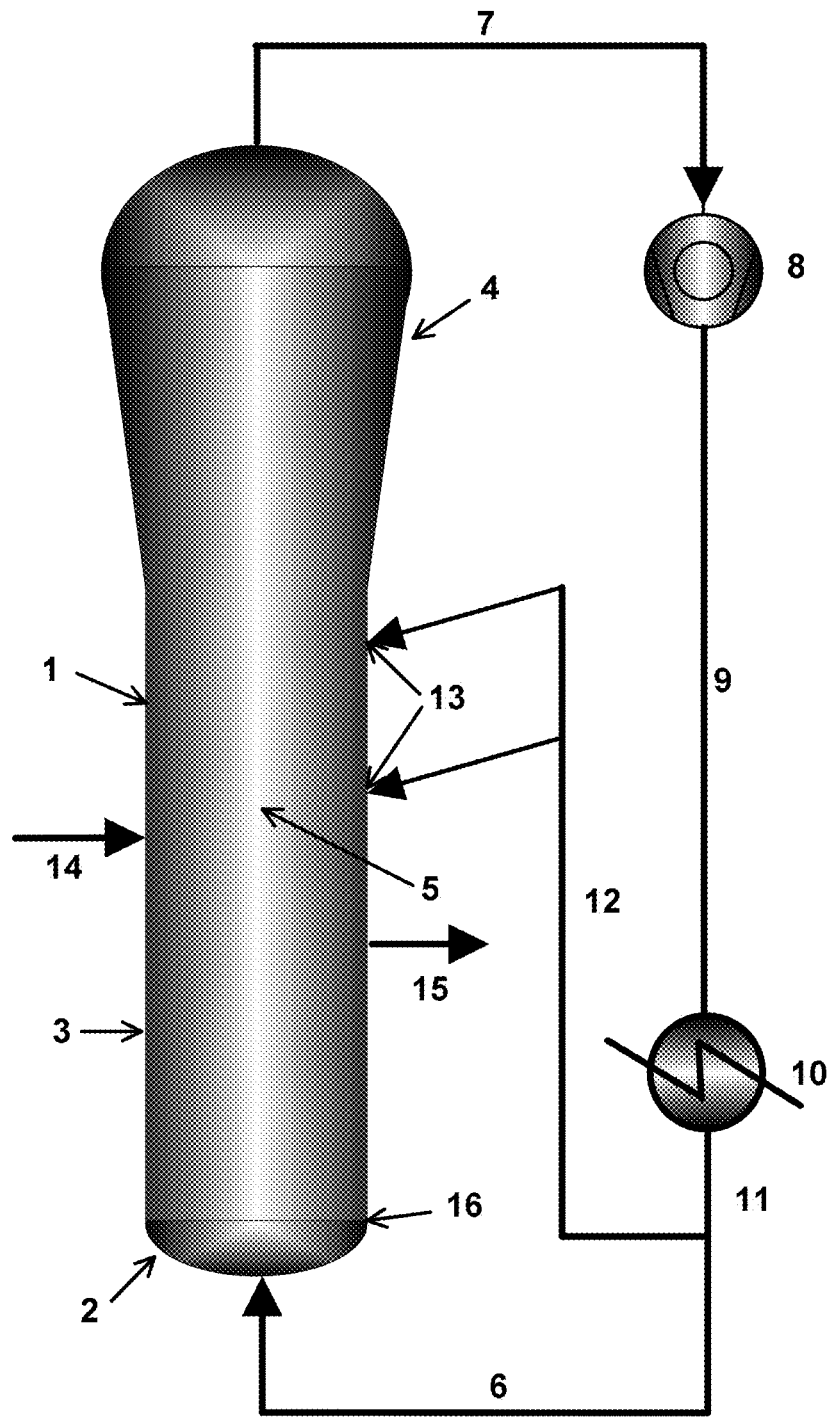
FIG. 1 shows an embodiment of the polymerization process according to the present invention in a fluidized bed reactor with a fluidization grid.

1 fluidized bed reactor
2 bottom zone
3 middle zone
4 disengaging zone (top zone)
5 fluidized bed (dense zone)
6 first stream of fluidized gas
7 second stream of fluidized gas
8 compressor
9 compressed second stream of fluidized gas
10 cooler
11 cooled second stream of fluidized gas
12 cooled third stream of fluidized gas
13 feeding ports for the cooled third stream of fluidized gas
14 feeding port for polymerization catalyst
15 polymer withdrawal
16 fluidization grid Description of FIG. 1

FIG. 1 shows an embodiment of the gas solids olefin polymerization reactor system according to the present invention. The fluidized bed reactor (1) comprises a bottom zone (2), a middle zone (3) and a disengaging zone as top zone (4). The middle zone (3) and the bottom zone (2) are separated by the fluidization grid (16). The first stream of fluidized gas (6) enters the fluidized bed reactor (1) through the bottom zone (2) and flows upwards, thereby passing the fluidization grid (16) and entering the middle zone (3). Due to the substantially cylindrical shape of the middle zone (3) the gas velocity is constant so that above the fluidization grid (16) the fluidized bed (5) is established in the middle zone (3). Due to the conical shape of the disengaging zone (4) the gas entering the disengaging zone (4) expands so that the gas disengages from the polyolefin product of the polymerization reaction so that the fluidized bed (5) is confined in the middle zone (3) and the lower part of the disengaging zone (4). The polymerization catalyst is introduced into the fluidized bed reactor (1) through feeding port (14) directly into the fluidized bed (5). The polyolefin product of the polymerization process is withdrawn from the fluidized bed reactor through outlet (15).

The fluidized gas is withdrawn from the disengaging zone (4) as second stream of fluidization gas (7) and introduced into a compressor (8). The compressed second stream (9) is withdrawn from the compressor (8) and introduced into a cooler (10). The cooled second stream (11) is withdrawn from the cooler (10) and split into a third cooled stream (12) and the first stream (6). The cooled third stream (12) is introduced into fluidized bed (5) of the fluidized bed reactor (1) through one or more feeding ports (13) as such that the fluidized gas of the cooled third stream (12) is directed into the fluidized bed (5).

REFERENCE SIGNS FOR FIG. 3 a projection of the direction of the cooled third stream
b perpendicular line
c projection plane
d tangent plane
e location of the feeding port
f intersection line
g generally cylindrical surface of the middle zone
α introduction angle
γ angle between planes (c) and (d)

Figure 3:
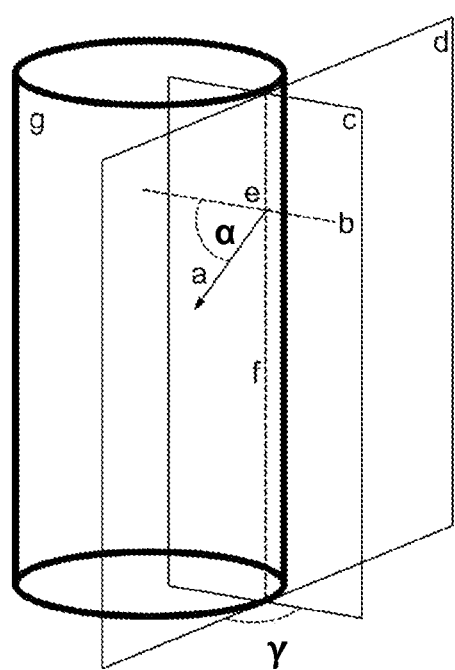
FIG. 3 shows the definition of the introduction angle of the cooled third stream.

Description of FIG. 3

FIG. 3 demonstrates the definition of the introduction angel α of the cooled third stream. Said introduction angle (α) is the angle between a projection (a) and a perpendicular line (b), whereas the projection (a) is the projection of the direction of the cooled third stream after introduction into the reactor on a projection plane (c), which crosses the tangent plane (d) of the generally cylindrical shape (g) of the middle zone at the location of the one or more feeding ports (e) and along an intersection line (f) between the tangent plane (d) and the generally cylindrical surface (g) of the middle zone, whereas the projection plane (c) is located perpendicular to the tangent plane (d) (γ=90°) and whereas the perpendicular line (b) crosses the generally cylindrical surface (g) of the middle zone at the location of the feeding port (e), is parallel to projection plane (c) and is perpendicular to tangent plane (d).

EXAMPLES

Figure 2:
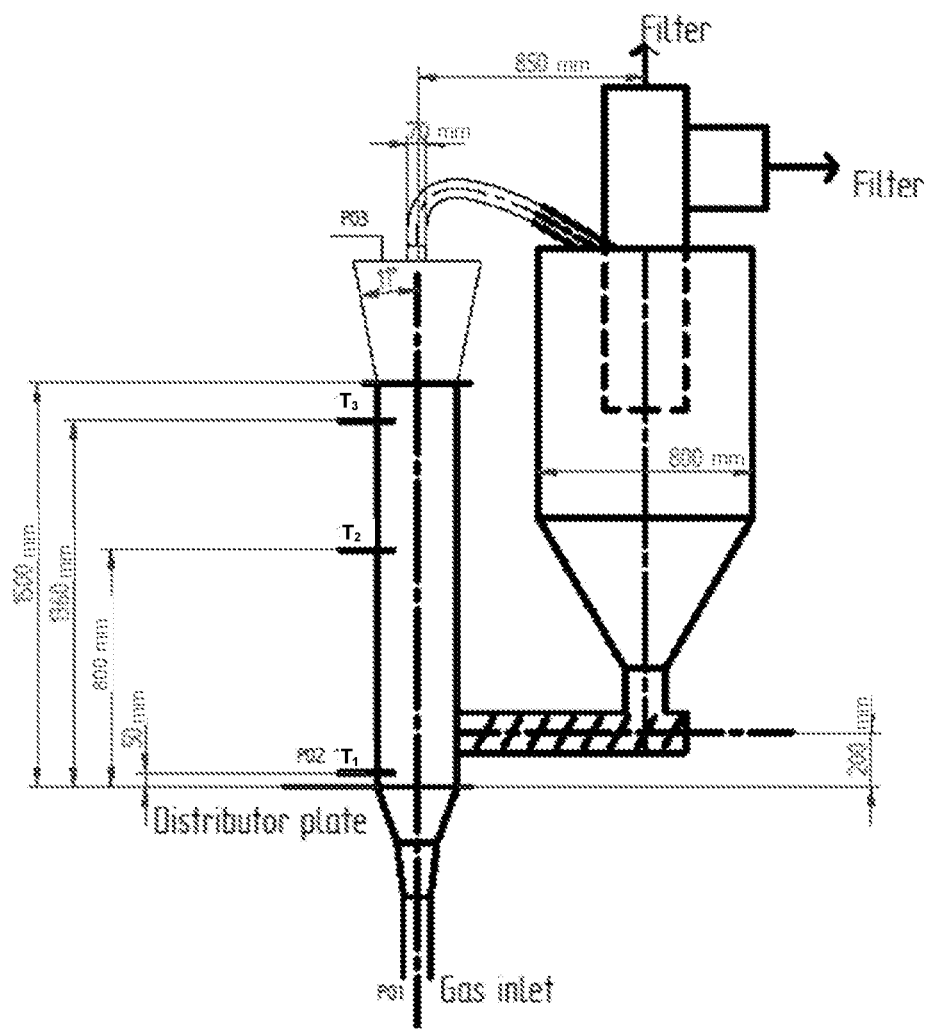
FIG. 2 shows the experimental set-up of the temperature measurement in the experimental part.

FIG. 2 shows the reactor set-up used for the example 1 of the present invention. Thereby, the dimensions of the reactor set-up are given in FIG. 2. The reactor set-up comprises a fluidized bed reactor comprising a fluidization grid (or distributor plate) into which before the start of the experiments HDPE powder was filled.

Example 1

The experimental set up mentioned above was employed to assess the effect of the spit fluidized gas concept on the cooling capability and the thermal homogeneity in the fluidized bed reactor. Through the gas inlet at the bottom of the fluidized bed reactor cold fluidization gas was introduced at a volumetric feeding rate equal to 137 m³/h to establish a superficial gas velocity just above the fluidization grid of 0.54 m/s so that a fluidized bed of HDPE with a height of 86 cm was established in the middle zone of the reactor above the fluidization grid. The superficial gas velocity at the end of the fluidized reactor horizontal part (i.e., end of dense phase) was kept constant at 0.54 m/s throughout the whole experiment.

The temperature in the fluidized bed reactor is measured throughout the whole experiment at three measuring points $T_1$, located at a point of 5 cm above the distribution plate, $T_2$, located at a point of 80 cm above the distribution plate and $T_3$, located at a point of 136 cm above the distribution plate. Thereby, at measuring points $T_1$ and $T_2$ the temperature of the dense phase of the fluidized bed is measured whereas at measuring point $T_3$ a mixed temperature of gas and solid in the lean phase of the fluidized bed above the dense phase of the fluidized bed is measured.

2.5 min after starting to introduce cold fluidization gas the heating of the fluidization gas was switched on and the fluidization gas was controlled to have a temperature of 100° C. at the entry at the bottom end of the fluidized bed. The hot fluidization gas feed was kept at a constant flow of 137 m³/h. The HDPE powder in the fluidized bed was heated by the hot fluidization gas until thermal equilibrium was reached after about 70 min after starting to introduce hot fluidization gas. The temperature measurement points $T_1$ and $T_3$ were deviating from each other by approximately 3° C. showing that the gas-solid mixing conditions in the bed is not ideal (i.e., $T_1$=73° C. and $T_3$=70° C.).

72 min after starting to introduce hot fluidization gas from the bottom of the reactor, its volumetric flow rate was reduced from 137 m³/h to 91 m³/h and at the same time cooled fluidization gas circulation stream (i.e., at temperature equal to 25° C.) was reintroduced into the fluidized bed reactor through a injection point in the middle zone of the fluidized bed reactor into the dense zone of the HDPE powder in a downwards direction in an angle of 20°, determined from the general cylindrical shape of the middle zone. The cooled fluidization gas circulation stream had a constant flow of 46 m³/h and a pressure difference between that injection point and the fluidized bed reactor was equal to 3 bar (i.e., ΔP=3 bar). With the constant flow of the hot fluidization gas of 91 m³/h, the split of the cooled fluidization gas circulation stream (JG) and the hot fluidization gas stream (FG) was 33.5:66.5 (v/v).

After introducing the cooled fluidization gas circulation stream at t=72 min the temperature at all three measuring points drops by about 10° C. until again an equilibrium is obtained.

It has to be highlighted that during the heating phase of the HDPE powder in the fluidized bed at t=2.5 min to t=72 min the temperatures of the dense phase of the fluidized bed $T_1$ and $T_3$ were deviating each other by 3° C. After introducing the cooled fluidization gas circulation stream all the three measuring points were exactly the same ($T_1$=$T_2$=$T_3$=60° C.).

The contact of the cooled fluidization gas circulation stream and the HDPE powder in the fluidized bed leads to an improved mixing of the polymer powder in the fluidized bed resulting in an efficient heat exchange and a decreasing fluidized bed temperature. From the same temperature profile at the measuring points of the dense phase of the fluidized bed $T_1$ and $T_2$ and the measuring point of the mixed temperature of gas and solid in the lean phase of the fluidized bed $T_3$ it can be concluded that the cooled fluidization gas circulation stream contributes to sufficient heat removal from the fluidized bed.

Examples 2-4

In Examples 2-4, the same reactor set-up used for the Example 1 was employed with the only difference being that $T_1$ was located at the middle of the dense zone of the fluidized bed reactor, $T_2$ was located at the inlet pipe of the cooled fluidization gas circulation stream and $T_3$ was located at the top gas pipe exit (see FIG. 3).

Example 2 (Comparative)

Through the gas inlet at the bottom of the fluidized bed reactor hot fluidization gas (FG) was introduced at a feeding rate equal to 150 m³/h to establish a superficial gas velocity just above the fluidization grid of 0.60 m/s. The superficial gas velocity at the end of the fluidized reactor horizontal part (i.e., end of dense phase) was kept constant at 0.60 m/s throughout the whole experiment.

The temperature in the fluidized bed reactor after 60 min of operation reached a steady state value (thermal equilibrium) of 60° C. measured at three measuring points $T_1$ (located at the middle of the dense reactor zone), $T_2$ (located at the cooled fluidization gas circulation stream) and $T_3$ (located at the top gas pipe exit). The hot fluidization gas feed was kept at a constant flow of 150 m³/h.

62 min after starting to introduce hot fluidization gas into the bottom zone of the fluidized bed reactor, the fluidization gas withdrawn from the top zone of the fluidized bed reactor was directed through a compressor/cooler unit in order to cool it down to a temperature equal to 25° C. before re-introducing the cooled fluidization gas (FG) stream into the bottom zone of the fluidized bed reactor. The volumetric gas flow rate of the cooled fluidization gas was not changed and it was equal to 150 m³/h. No cooled fluidization gas circulation (jet gas (JG)) stream was used and the split between the jet gas (JG) stream and the fluidization gas (FG) stream was 0.0:100.0 (v/v).

The temperature in the dense phase of the fluidized bed captured by the measurement point $T_1$ was equal to 60° C. at the steady state operation (introduction of hot FG stream). After that the fluidized bed was cooled by using only cooled fluidization gas (FG) for 30 min.

The temperature decrease rate in the fluidized bed reactor (measured at measure point $T_1$) after 10 min, 20 min and 30 min ($\Delta T_{10}$, $\Delta T_{20}$ and $\Delta T_{30}$) was equal to 15° C./10 min, 20.5° C./20 min and 25° C./30 min, respectively.

The main conditions and results of this experiment are summarized in Table 1.

TABLE 1

Conditions and main results of Example 2.

| Conditions | Values |
|---|---|
| JG Pressure drop [bar] | 0 |
| JG Flow [m³/h] (% Split (v/v)) | 0 (0% split) |
| FG Flow [m³/h] (% Split (v/v)) | 150.0 (100% Split) |
| Overall Gas Feed [m³/h] | 150.0 |
| $SGV_{FG}$ [m/s] | 0.60 |
| $SGV_{total}$ [m/s] | 0.60 |
| Final bulk density (Kg/m³) | 250 |
| $\Delta T_{10}$ (° C./10 min) | 15 |
| $\Delta T_{20}$ (° C./20 min) | 20.5 |
| $\Delta T_{30}$ (° C./30 min) | 25 |

Example 3 (Inventive)

The Example 2 was repeated. Heating of the bed fluidization bed reactor was performed following the procedure described in Example 2. The temperature in the fluidized bed reactor after 60 mins of operation reached a steady state value (thermal equilibrium) of 60° C. measured at three measuring points $T_1$ (located at the middle of the dense reactor zone), $T_2$ (located at the cooled fluidization gas circulation stream) and $T_3$ (located at the top gas pipe exit). The hot fluidization gas feed was kept at a constant flow of 150 m³/h.

62 min after starting to introduce hot fluidization gas from the bottom of the fluidized bed reactor, the fluidization gas withdrawn from the top zone of the fluidized bed reactor was directed through a compressor/cooler unit in order to cool it down to a temperature equal to 25° C. The volumetric gas flow rate of the cooled fluidization gas (FG) stream re-introduced into the bottom zone of the fluidized bed reactor was reduced from 150 m³/h to 110 m³/h. In this experiment cooled fluidization gas circulation (jet gas (JG)) stream having a temperature of 25° C. was introduced into the fluidized bed reactor through an injection point in the middle zone of the fluidized bed reactor into the dense zone of the HDPE powder in a downwards direction in an angle of 20°, determined from the general cylindrical shape of the middle zone ($\Delta P$ for injecting the JG was 5.0 bar, see Table 2) and the split between the fluidization gas circulation stream (JG) and the fluidization gas stream (FG) was 26.7:73.3 (v/v).

The temperature in the dense phase of the fluidized bed captured by the measurement point $T_1$ was equal to 60° C. at the steady state operation (introduction of hot FG stream). After that, the fluidized bed reactor was cooled by using both FG and JG for 30 min.

The temperature decrease rate in the fluidized bed reactor ((measured at measure point $T_1$)) after 10 min, 20 min and 30 min ($\Delta T_{10}$, $\Delta T_{20}$ and $\Delta T_{30}$) was equal to 17° C./10 min, 24.5° C./20 min and 28° C./30 min, respectively.

The main conditions and results of this experiment are summarized in Table 2.

TABLE 2

Conditions and main results of Example 3.

| Conditions | Values |
|---|---|
| JG Pressure drop [bar] | 5 |
| JG Flow [m³/h] (% Split (v/v)) | 40.0 (26.7% split) |
| FG Flow [m³/h] (% Split (v/v)) | 110.0 (73.3% Split) |
| Overall Gas Feed [m³/h] | 150.0 |
| $SGV_{FG}$ [m/s] | 0.43 |
| $SGV_{total}$ [m/s] | 0.60 |
| Final bulk density (Kg/m³) | 330 |
| $\Delta T_{10}$ (° C./10 min) | 17 |
| $\Delta T_{20}$ (° C./20 min) | 24.5 |
| $\Delta T_{30}$ (° C./30 min) | 28 |

Example 4 (Inventive)

The Example 2 was repeated. Heating of the bed fluidization bed reactor was performed following the procedure described in Example 2. The temperature in the fluidized bed reactor after 60 mins of operation reached a steady state value (thermal equilibrium) of 60° C. measured at three measuring points $T_1$ (located at the middle of the dense reactor zone), $T_2$ (located at the cooled fluidization gas circulation stream) and $T_3$ (located at the top gas pipe exit). The hot fluidization gas feed was kept at a constant flow of 150 m³/h.

62 min after starting to introduce hot fluidization gas from the bottom of the fluidized bed reactor, the fluidization gas withdrawn from the top zone of the fluidized bed reactor was directed through a compressor/cooler unit in order to cool it down to a temperature equal to 25° C. The volumetric gas flow rate of the cooled fluidization gas (FG) stream re-introduced into the bottom zone of the fluidized bed reactor was reduced from 150 m³/h to 110 m³/h. In this experiment cooled fluidization gas circulation (jet gas (JG)) stream having a temperature of 25° C. was introduced into the fluidized bed reactor through an injection point in the middle zone of the fluidized bed reactor into the dense zone of the HDPE powder in a downwards direction in an angle of 20°, determined from the general cylindrical shape of the middle zone ($\Delta P$ for injecting the JG was 2.25 bar, see Table 3) and the split between the fluidization gas circulation stream (JG) and the fluidization gas stream (FG) was 26.7:73.3 (v/v).

The temperature in the dense phase of the fluidized bed captured by the measurement point $T_1$ was equal to 60° C. at the steady state operation (introduction of hot FG stream). After that, the fluidized bed reactor was cooled by using both FG and JG for 30 min.

The temperature decrease rate in the fluidized bed reactor (measured at measure point $T_1$) after 10 min, 20 min and 30 min ($\Delta T_{10}$, $\Delta T_{20}$ and $\Delta T_{30}$) was equal to 16° C./10 min, 23.5° C./20 min and 28° C./30 min, respectively.

The main conditions and results of this experiment are summarized in Table 3.

TABLE 3

Conditions and main results of Example 4.

| Conditions | Values |
|---|---|
| JG Pressure drop [bar] | 2.25 |
| JG Flow [m³/h] (% Split (v/v)) | 40.0 (67.7% split) |
| FG Flow [m³/h] (% Split (v/v)) | 110.0 (73.3% Split) |
| Overall Gas Feed [m³/h] | 150.0 |
| $SGV_{FG}$ [m/s] | 0.43 |
| $SGV_{total}$ [m/s] | 0.60 |
| Final bulk density (Kg/m³) | 325 |
| $\Delta T_{10}$ (° C./10 min) | 16 |
| $\Delta T_{20}$ (° C./20 min) | 23.5 |
| $\Delta T_{30}$ (° C./30 min) | 28 |

By comparing the results depicted in Table 1 with those shown in Tables 2 and 3 it can be seen that the use of JG has a positive influence on the cooling effect/capacity in the fluidized bed reactor. More specifically, the cooling rate in the fluidized bed reactor, expressed by $\Delta T_{10}$, $\Delta T_{20}$ and $\Delta T_{30}$, is enhanced when JG is used. It is also apparent that even at a lower pressure drop $\Delta P$ for injecting the JG, the cooling effect of JG in the fluidized bed reactor is fully maintained and is better compared to comparative example 1 where all the fluidization gas was introduced from the bottom of the fluidized bed reactor. Similarly, the fluidized bulk density attains higher values (i.e., 330 kg/m³ and 325 kg/m³) compared to comparative example 1 (i.e., 250 kg/m³), which is a direct indication of solids carry reduction.

The invention claimed is:

1. A method for improving the cooling capacity of a gas solids olefin polymerization reactor comprising:
   a top zone;
   a middle zone, which comprises a top end in direct contact with said top zone and which is located below said top zone, the middle zone having a generally cylindrical shape; and
   a bottom zone, which is in direct contact with a bottom end of the middle zone and which is located below the middle zone;
   comprising the following steps:
   a) introducing a first stream of fluidization gas into the bottom zone;
   b) polymerizing olefin monomer(s) in the presence of a polymerization catalyst in a dense phase formed by particles of a polymer of the olefin monomer(s) suspended in an upwards flowing stream of the fluidization gas in the middle zone;
   c) withdrawing a second stream comprising the fluidization gas from the top zone;
   d) introducing the second stream into a cooler;
   e) withdrawing the cooled second stream from the cooler; and
   f) splitting the cooled second stream into a cooled third stream and the first stream;
   g) introducing the cooled third stream through one or more feeding ports in a feeding area of the middle zone at the dense phase in the middle zone of the gas solids olefin polymerization reactor;
   wherein the cooled third stream comprises from 1 to 30 wt % condensed fluidization gas, and
   wherein a bulk density of the dense phase during polymerization is in the range of from 100 to 500 kg/m³.

2. The method according to claim 1, wherein the feeding area of the middle zone is located on the surface of the middle zone between the top end and 50% of the total height of the middle zone, whereas the bottom end corresponds to 0% and the top end corresponds to 100% of the total height of the middle zone.

3. The method according to claim 1, wherein difference of the maximum temperature and the minimum temperature, $\Delta T$, of the dense phase during polymerization is not higher than 10° C.

4. The method according to claim 1, wherein the cooled third stream is introduced through the one or more feeding ports into the dense phase in the middle zone of the gas solids olefin polymerization reactor in an angle of 5° to 75°, wherein the introduction angle is the angle between
   the projection of the direction of the cooled third stream after introduction into the reactor on a projection plane, which crosses a tangent plane of the generally cylindrical shape of the middle zone at the location of the one or more feeding ports and along an intersection line between the tangent plane and the generally cylindrical surface of the middle zone, whereas the projection plane is located perpendicular to the tangent plane, and
   a perpendicular line, which
     crosses the generally cylindrical surface of the middle zone at the location of the one or more feeding ports,
     is located parallel to the projection plane, and
     is perpendicular to the tangent plane.

5. The method according to claim 1, wherein number of feeding ports for introducing the cooled third stream is in the range of 1 to 15.

6. The method according to claim 1, wherein the feeding ports are distributed across the middle zone of the gas solids olefin polymerization reactor in axial and/or radial direction with the proviso that the cooled third stream is introduced into the dense phase.

7. The method according to claim 1, wherein the cooled second stream is split into the cooled third stream and the first stream at a ratio of 5:95 (v/v) to 75:25 (v/v).

8. The method according to claim 1, further comprising the steps of introducing the second stream into a compressor; withdrawing the compressed second stream from the compressor and introducing the compressed second stream into the cooler.

9. The method according to claim 8 wherein the pressure difference between the cooled third stream and the polymerization pressure in the gas solids polymerization reactor, $\Delta P$, is at least 0.1 bar.

10. The method according to claim 1, wherein the superficial gas velocity of the upwards flowing stream of the fluidization gas in the middle zone is from 0.3 to 1.2 m/s.

11. The method according to claim 10 wherein the superficial gas velocity of the first stream of fluidization gas introduced into the bottom zone is lower than the superficial gas velocity of the upwards flowing stream of the fluidization gas in the middle zone and is in the range of from 0.1 to 1.3 m/s.

12. The method according to claim 1, wherein the gas solids olefin polymerization reactor is a fluidized bed reactor comprising a fluidization grid.

13. The method according to claim 1, wherein the gas solids olefin polymerization reactor is a fluidized bed reactor comprising a top zone having a generally conical shape, a middle zone, in direct contact with said top zone and located below said top zone, having a generally cylindrical shape, a bottom zone, in direct contact with said middle zone and located below said middle zone, having a generally conical shape, the gas solids olefin polymerization reactor not containing a fluidization grid.

* * * * *